(No Model.)
F. S. CHURCH.
VEHICLE AXLE.
No. 489,180. Patented Jan. 3, 1893.
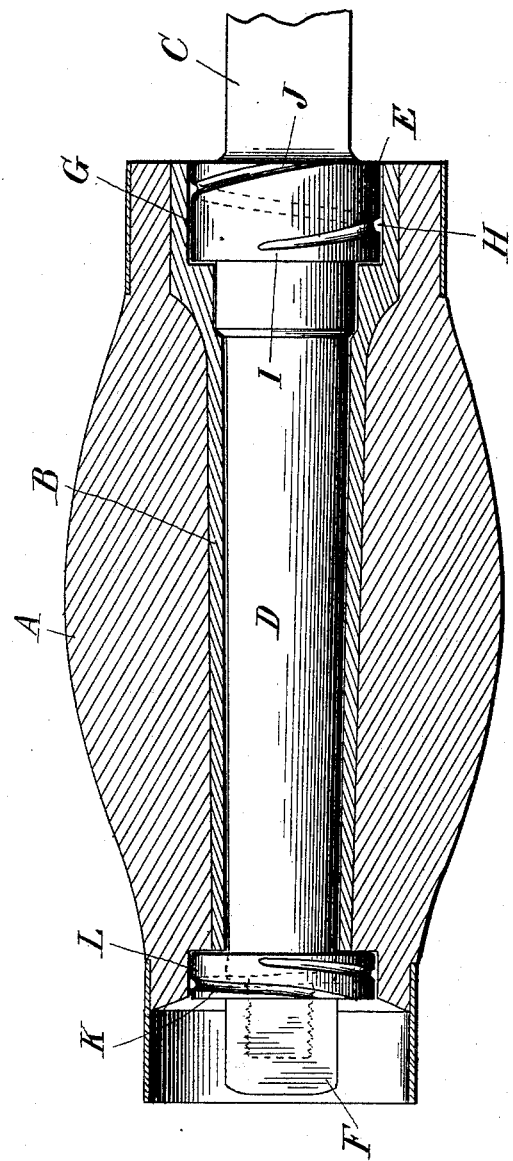
Witnesses:
P. M. Hulbert
M. Dougherty
Inventor:
Frank S. Church
By Sprague & Co.
Atty's.

UNITED STATES PATENT OFFICE.

FRANK S. CHURCH, OF DETROIT, MICHIGAN, ASSIGNOR OF ONE-HALF TO WM. FITZ-HUGH EDWARDS, OF SAME PLACE.

VEHICLE-AXLE.

SPECIFICATION forming part of Letters Patent No. 489,180, dated January 3, 1893.

Application filed March 31, 1892. Serial No. 427,188. (No model.)

*To all whom it may concern:*

Be it known that I, FRANK S. CHURCH, a citizen of the United States, residing at Detroit, in the county of Wayne and State of Michigan, have invented certain new and useful Improvements in Vehicle-Axles, of which the following is a specification, reference being had therein to the accompanying drawing.

This invention relates to new and useful improvements in vehicle axles, and the invention consists in the peculiar construction of the collar and the axle nut whereby dust is prevented from reaching the journal, all as more fully hereinafter described.

In the drawing, I show a vertical, central, longitudinal section through a vehicle hub and axle illustrating my invention.

A is the hub, B the skein thereof, C the axle D the spindle of the axle, E the dust collar, F the nut, all of known and usual construction except as hereinafter described.

G is a socket or enlargement formed in the skein around the collar E.

In the previous state of the art many attempts have been made to make dust guards for carriage journals, but so far as I am aware they all embody attachments to be made to the axle outside of the hub, while my invention consists in forming a spiral groove upon the collar E, which by the motion of the hub around that collar will act to wear the dust from the inside outward and thereby prevent the possibility of any of the dust working beyond the collar into the journal.

H is a groove extending from the rim I formed at the rear edge of the collar E and passing spirally around that collar to the outside thereof, as plainly shown in the drawing. This spiral groove is so arranged that the forward movement of the hub around the axle will be in the direction which will work any material in this groove from the inside toward the outside, thus, in case any sand should work its way into the socket G the continued revolution of the hub as described will act to carry the dust around the spiral groove and finally discharge it through the discharge opening J outside and the rim I will prevent the possibility of the dust passing beyond the inner end of the groove into the journal.

To protect the other end of the spindle against the working in of the dust I form an oppositely arranged spiral groove K in the flange L on the nut F, which will act in the same manner to carry the dust from the inside out. Thus with an axle having the grooves formed on the collar and nut as described, it has been found that no dust whatever can penetrate to the journal.

By making the rim I between the groove and the journal or spindle the screw action of the groove H will not in any way draw the oil from the spindle as might be the case if the rim I were omitted.

What I claim as my invention is:

In a vehicle axle the combination with the spindle, of a dust collar formed at one end thereof, having a spiral groove therein extending from a point near the inner edge to the outer edge thereof, a rim between the groove and spindle and a nut at the opposite end of the spindle having a flange thereon, a spiral groove therein extending from the inner to the outer edge thereof, the grooves in the collar and nut being pitched in an opposite direction, substantially as described.

In testimony whereof I affix my signature in presence of two witnesses.

FRANK S. CHURCH.

Witnesses:
M. B. O'DOGHERTY,
N. L. LINDOP.